United States Patent
Stolle et al.

(10) Patent No.: US 8,286,319 B2
(45) Date of Patent: Oct. 16, 2012

(54) METHOD OF CONNECTING CHASSIS PARTS, AND A CHASSIS ASSEMBLY

(75) Inventors: Jens Stolle, Stukenbrok (DE); Dirk Voigt, Altenbeken (DE); Franz Beer, Neunburg Formwald (DE)

(73) Assignee: Benteler Automobiletechnik GmbH, Paderborn (DE)

( * ) Notice: Subject to any disclaimer, the term of this patent is extended or adjusted under 35 U.S.C. 154(b) by 340 days.

(21) Appl. No.: 12/542,212

(22) Filed: Aug. 17, 2009

(65) Prior Publication Data

US 2010/0038893 A1    Feb. 18, 2010

(30) Foreign Application Priority Data

Aug. 18, 2008  (DE) .......................... 10 2008 038 276

(51) Int. Cl.
*B21D 39/04* (2006.01)
*B21D 26/035* (2011.01)

(52) U.S. Cl. .......... 29/421.1; 29/507; 29/509; 29/897.2; 29/523; 29/521; 285/382.5; 403/274; 72/370.22; 72/370.26; 72/58; 72/61

(58) Field of Classification Search ................ 29/421.1, 29/445, 507, 509, 897.2, 523, 521; 285/382.4, 285/382.5; 403/274; 72/370.22, 370.26, 72/370.23, 54, 58, 60, 61
See application file for complete search history.

(56) References Cited

U.S. PATENT DOCUMENTS

| | | | | |
|---|---|---|---|---|
| 338,877 A * | 3/1886 | Ritchie | .......................... | 285/403 |
| 1,291,646 A * | 1/1919 | Hughes | .......................... | 285/222 |
| 2,321,755 A * | 6/1943 | Kost | .............................. | 52/592.3 |
| 2,477,676 A * | 8/1949 | Woodling | ...................... | 285/281 |
| 2,695,446 A * | 11/1954 | Meyer | .............................. | 29/523 |
| 3,112,564 A * | 12/1963 | Murray | ......................... | 228/136 |
| 3,357,388 A * | 12/1967 | Dunn | .............................. | 413/14 |
| 3,479,733 A * | 11/1969 | Brown | .............................. | 29/509 |
| 3,690,706 A * | 9/1972 | Boik et al. | ..................... | 403/282 |
| 3,719,986 A * | 3/1973 | Ardolino et al. | ................. | 29/509 |
| 3,728,881 A * | 4/1973 | Coop | .............................. | 72/52 |
| 3,824,757 A * | 7/1974 | Coop | .............................. | 138/166 |
| 3,909,919 A * | 10/1975 | Miyabayashi et al. | .......... | 29/521 |
| 4,132,437 A * | 1/1979 | Green | ............................ | 285/263 |
| 4,142,581 A * | 3/1979 | Yoshitomi et al. | ............. | 165/173 |
| 4,151,632 A * | 5/1979 | Green | ........................... | 29/441.1 |

(Continued)

FOREIGN PATENT DOCUMENTS

DE    197 21 478 A1    11/1998

(Continued)

OTHER PUBLICATIONS

"Fügen und Umformen vereint.", Dr. B. Stump: Fügen und Umformen vereint. In: Automobil-Produktion, vol. May 2008 p. 66, 69 ISSN 0934-0394.

*Primary Examiner* — David Bryant
*Assistant Examiner* — Jason L Vaughan
(74) *Attorney, Agent, or Firm* — Henry M. Feiereisen, LLC

(57) ABSTRACT

In a method of connecting chassis parts to produce a chassis assembly, at least one end of a first chassis part is connected with a second chassis part in an overlap zone by a form fit and an interference fit through an internal high pressure joining process. The second chassis part serves hereby a seal of the one end of the first chassis element.

4 Claims, 2 Drawing Sheets

U.S. PATENT DOCUMENTS

| | | | | |
|---|---|---|---|---|
| 4,174,559 A | * | 11/1979 | Persik et al. | 29/509 |
| RE30,802 E | * | 11/1981 | Rogers, Jr. | 29/421.1 |
| 4,897,912 A | * | 2/1990 | Slasinski | 29/432.2 |
| 5,051,020 A | * | 9/1991 | Schleicher | 403/282 |
| 5,697,155 A | * | 12/1997 | Bloecker et al. | 29/890.148 |
| 5,740,589 A | * | 4/1998 | Dominguez | 24/20 CW |
| 5,953,809 A | * | 9/1999 | Kowalski | 29/521 |
| 6,010,155 A | * | 1/2000 | Rinehart | 280/781 |
| 6,183,013 B1 | * | 2/2001 | Mackenzie et al. | 280/797 |
| 6,299,240 B1 | * | 10/2001 | Schroeder et al. | 296/203.01 |
| 6,340,396 B1 | * | 1/2002 | Ogawa et al. | 148/23 |
| 6,502,295 B1 | * | 1/2003 | Morgand | 29/509 |
| 6,574,849 B1 | * | 6/2003 | Bohm | 29/421.1 |
| 6,701,598 B2 | * | 3/2004 | Chen et al. | 29/421.1 |
| 6,742,258 B2 | | 6/2004 | Tarbutton et al. | |
| 7,175,204 B2 | | 2/2007 | Tarbutton et al. | |
| 7,337,641 B1 | * | 3/2008 | Bruggemann et al. | 72/58 |

FOREIGN PATENT DOCUMENTS

| | | |
|---|---|---|
| DE | 195 06 160 | 5/2006 |
| DE | 602 26 336 T2 | 5/2006 |
| DE | 196 53 509 B4 | 6/2006 |
| DE | 603 09 846 T2 | 6/2007 |
| DE | 10 2007 036 629 B3 | 7/2008 |
| WO | WO 03/076255 A1 | 3/2003 |

* cited by examiner

METHOD OF CONNECTING CHASSIS PARTS, AND A CHASSIS ASSEMBLY

CROSS-REFERENCES TO RELATED APPLICATIONS

This application claims the priority of German Patent Application, Serial No. 10 2008 038 276.0, filed Aug. 18, 2008, pursuant to 35 U.S.C. 119(a)-(d), the content of which is incorporated herein by reference in its entirety as if fully set forth herein.

BACKGROUND OF THE INVENTION

The present invention relates to a method of connecting chassis parts, and to a chassis assembly comprised of connected chassis parts.

The following discussion of related art is provided to assist the reader in understanding the advantages of the invention, and is not to be construed as an admission that this related art is prior art to this invention.

Many frame elements as well as chassis elements are connected together in the automobile industry through thermal joining processes. To reduce weight of motor vehicles, the frame and chassis elements are partly or entirely configured as hollow sections and welded together, in part with cast nodes as connection element. Thermal joining, such as welding, causes however problems in the connection zone as far as durability and corrosion resistance of the connection are concerned. In addition, stress is caused in the components in the joining area as a result of warping due to heat exposure. This decreases the strength of the frame and the chassis at the connection sites so that the overall strength of the chassis deteriorates. Also, the combination of various materials, such as aluminum and steel is rather limited when using thermal joining processes.

It would therefore be desirable and advantageous to address prior art shortcomings and to provide a connection of chassis parts to produce a chassis assembly capable to transmit tensile and pressure forces and to withstand torsional and bending stress.

SUMMARY OF THE INVENTION

According to one aspect of the present invention, a method of connecting chassis parts includes the step of connecting at least one end of a first chassis part with a second chassis part in an overlap zone by a form fit and an interference fit through an internal high pressure joining process, with the second chassis part effecting a seal of the one end of the first chassis element.

The present invention resolves prior art problems by overlapping at least one end of the first chassis part with an end of a second chassis part. In the overlap zone of the first and second chassis parts, the chassis parts are joined together in a form-fitting manner and by an interference fit through internal high pressure joining which involves a process by which a fluid under pressure is introduced into the first chassis part, whereby one end of the first chassis part, constructed as a profile element, is pushed into the second chassis part far enough to establish the overlap zone between the two chassis parts. During the internal high pressure joining process, the second chassis part serves as sealing element to seal the end of the first chassis part, overlapped by the end of the second chassis part. The end face of the first chassis part is hereby pressed flatly against an inner wall of the second chassis part so that fluid is prevented from migrating in the overlap zone between the wall of the first chassis part and the wall of the second chassis part and thus from rendering fluidic internal high pressure joining no longer effective.

It is, of course, conceivable to provide a seal between the end face of the first chassis part and the inner wall of the second chassis part. In this way, unevenness may, for example, be compensated. In any event, the space between the walls of the first and second chassis parts is completely sealed in the overlap zone with respect to the fluid.

The fluid, e.g. oil, after being introduced into the first chassis part is pressurized to cause the first chassis part to be pressed with its outside surface in the overlap zone against the inside surface of the second chassis part. As a result the wall of the first chassis part is deformed and conforms to the profile of the inside surface of the second chassis part. Thus, undercuts are provided between the walls of the chassis parts in length direction of the overlap zone to realize an interference fit and a form fit capable to withstand tensile and pressure forces as well as torsional and bending stress.

A process according to the present invention has the advantage that the inside surface of the profiled wall of the second chassis part can be used as die for the wall of the first chassis part during the internal high pressure joining process. The wall profile of the second chassis part can hereby be best suited in the overlap zone to different demands. At the same time, the second chassis part is used as sealing element to seal the first chassis part which is subjected to fluidic internal high pressure.

As the second chassis part thus assumes functions of a hydroforming plant, i.e. operates as a die, and contributes to a sealing of the first chassis part, it becomes possible to use an existing hydroforming plant without the need for complicated modifications in order to be able to connect chassis parts of varying configurations. Another benefit of a process according to the present invention is the capability to connect the chassis parts in the absence of any heat introduction so that the presence of temperature-based stress in the connection zone is eliminated.

The internal high pressure joining process allows also a connection between materials which normally are difficult to weld together. For example, a process according to the present invention allows connection of aluminum parts with steel tubes and steel sections, or aluminum tubes and aluminum sections with steel castings.

According to another advantageous feature of the present invention, the first chassis part may be clinched with the second chassis part in the overlap zone in addition to the internal high pressure joining process. Clinching involves penetration stacking by which the two chassis parts are connected in the absence of an additive.

To clinch to the outside, the inner wall of the second chassis part is provided with at least one recess. Stability can be enhanced by sizing the recess deeper than a maximum depth of the profiled wall in the overlap zone of the second chassis part. The fluidic pressure applied during the internal high pressure joining process causes part of the wall of the first chassis part to be pressed into the recess, resulting in a greater undercut in length direction of the overlap zone of the chassis parts.

According to another advantageous feature of the present invention, the at least one recess is configured in the form of a passageway through the wall of second chassis part. The diameter of the recess may hereby be constant. Currently preferred however is a recess diameter which is smaller on the inside surface of the wall than on the outside surface of the wall of the second chassis part.

Applying pressure during fluidic internal high pressure joining upon the wall of the first chassis part in the area of the recess causes the wall to be deformed in the recess. As the diameter of the recess increases from the inside surface to the outside surface, an undercut is realized between the walls of the chassis parts in perpendicular relationship to the length direction of the overlap zone.

According to another aspect of the present invention, a chassis assembly includes a first chassis part constructed in the form of a hollow section, and a second chassis part connected in an overlap zone with the first chassis part through an internal high pressure joining process and having one end in surrounding relationship to an end of the first chassis part, wherein the second chassis part is constructed in the form of a solid structure, such as a cast part or forged part.

A chassis assembly may involve for example a chassis sub-frame, twist-beam axle, or swivel bearing.

The connection of the chassis parts is implemented in an overlap zone of one end of the first chassis part with an end of the second chassis part in such a way that the end of the first chassis part is pushed into the receiving end of the second chassis part.

According to another advantageous feature of the present invention, the first and second chassis parts may be made of different materials, whereby different manufacturing processes can be used. The first chassis part may hereby be constructed in the form of a circumferentially closed hollow section or circumferentially open hollow section. The first chassis part may be box-shaped or tubular. The second chassis part can be manufactured through forging or casting.

After undergoing the internal high pressure joining process, the first chassis part has in the overlap zone with the second chassis part a configuration which conforms to the inside surface of the profiled wall of the second chassis part.

The connection between the first and second chassis parts is realized by interference fit as well as form fit as a result of the high pressure applied by the fluid during the internal high pressure joining process upon the wall of the first chassis part and thus also indirectly upon the wall of the second chassis part.

When the chassis parts are connected in addition to the internal high pressure joining process through clinching, the wall of the second chassis part has at least one recess in the overlap zone with the first chassis part. The recess may be configured as a depression in the inside surface of the profiled wall or a through hole extending from the inside surface to the outside surface. The recess may have a constant cross section or varying cross section. Advantageously, the cross section of the recess increases from the inside surface to the outside surface of the wall of the second chassis part. As a result, an undercut of the walls in perpendicular relationship to the length direction of the overlap zone is realized in addition to the undercuts between the walls in length direction of the overlap zone. This enhances stability of the connection. The change in cross section may hereby be continuous, e.g. funnel-shaped, or discontinuous, e.g. step-shaped.

In the event of a step-shaped configuration in particular, it is advantageous to arrange a plunger in the recess during clinching. The plunger presses the wall portion formed in the recess by the internal high pressure joining process against the stepped area in parallel relationship to the length direction of the overlap zone so that this wall portion receives a shape of a rivet.

This additional undercut between the walls of the chassis parts increases the strength of the connection.

The connection between two or more chassis parts through application of the internal high pressure joining process causes little stress and causes no warping due to heat or an adverse effect on the corrosion resistance of the components. The connection between the chassis parts is able to withstand torsional and bending stress and includes an interference fit as well as a form fit. The connection is easy to make and can easily be suited to different chassis parts.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
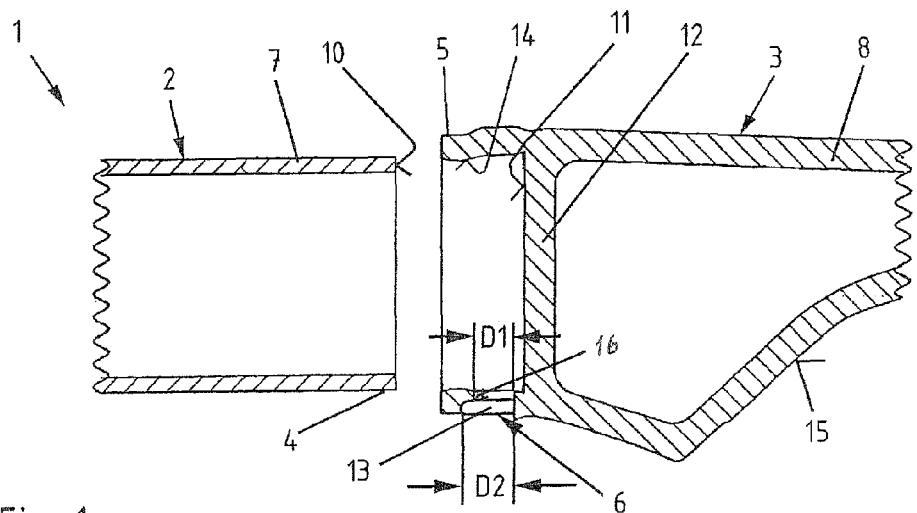
FIGS. 1, 1a, 1b show sectional views of successive steps of a method of connecting chassis parts in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1A:
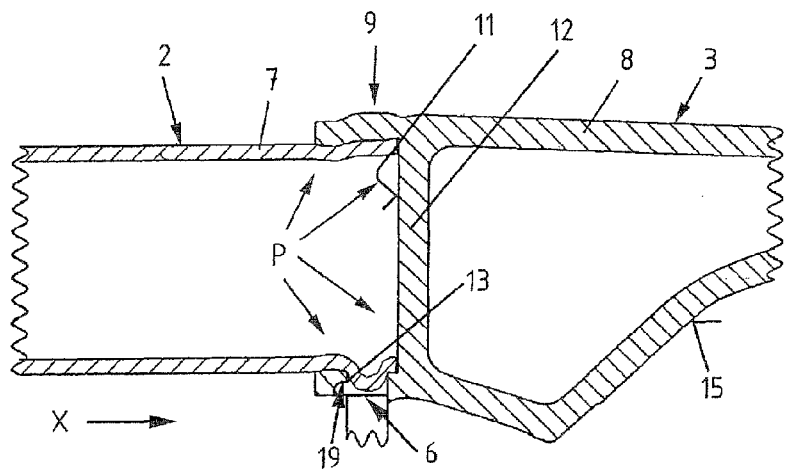
Figure 1B:
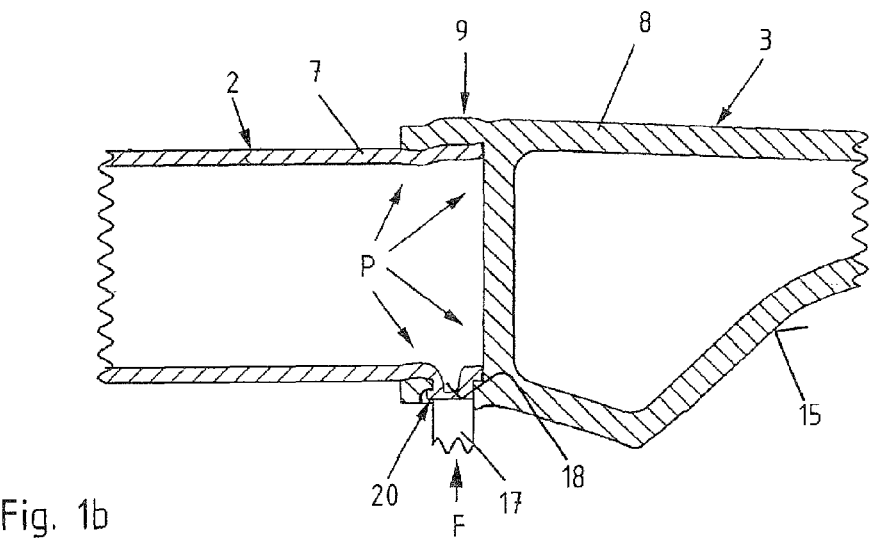

Turning now to the drawing, and in particular to FIGS. 1, 1a, 1b, there are shown sectional views of successive steps of a method of connecting chassis parts in accordance with the present invention. FIG. 1 shows two chassis parts 2, 3 in their starting position with their ends 4, 5 confronting one another. The chassis part 2 is constructed as hollow section and the chassis part 3 is constructed as cast part.

In a first process step, the end 4 of the chassis part 2 is pushed into the receiving end 5 of the chassis part 3 to thereby establish an overlap zone 9 between a wall 7 of the chassis 2 and a wall 8 of the chassis part 3. This is shown in FIG. 1a. An end face 10 of the chassis part 2 rests hereby flatly against a side 11 of an inner wall 12 within the chassis part 3. As a result, fluid is prevented from migrating between the wall 7 of the chassis part 2 and the wall 8 of the chassis part 3. Although not shown in detail, a sealing element may be arranged in addition between the end face 10 of the chassis part 2 and the inner wall 12 of the chassis part 3.

Formed in the profiled wall 8 of the chassis part 3 is a recess 6 in the form of a through opening 13 which extends from an inside surface 14 of the wall 8 of the chassis part 3 to an outside surface 15 of the wall 8. On the inside surface 14, the recess 6 has a diameter D1 which is smaller than a diameter D2 of the recess 6 on the outside surface 15. Thus, the recess 6 has a transition from the inner diameter D1 to the outer diameter D2 which is discontinuous in the form of a step 16.

During internal high pressure joining, the inside surface 14 of the profiled wall 8 of the chassis part 3 is used in the overlap zone 9 as die for the deformation of the wall 7 of the chassis part 2.

After establishing the overlap zone 9 between the chassis parts 2, 3, as shown in FIG. 1a, fluid, e.g. oil, is introduced into the chassis part 2. The chassis part 3 acts hereby as a seal for the chassis part 2 by completely sealing and embracing the end 4 of the chassis part 2. The fluid in the chassis part 2 is under a pressure P which is evenly applied in the overlap zone 9 onto the wall 7 of the chassis part 2. The pressure application causes the wall 7 of the chassis part 2 to be pressed in the overlap zone 9 against the inside surface 14 of the profiled wall 8 of the chassis part 3 and into the recess 6. As a result, undercuts 20 are formed between the walls 7, 8 of the chassis parts 2, 3 in length direction X of the overlap zone 9.

Arranged in the recess 6 is a plunger 17 which is used as counter member during clinching while undergoing the internal high pressure joining process, as shown in FIG. 1b. The plunger 17 may also be moved in the direction of the indicated force F. Clinching is executed as soon as the deformation of the wall 7 has progressed beyond the step 16 of the recess 6. A counterforce F is hereby applied via the face area 18 of the plunger 17 in the recess 6 onto the deforming portion of the wall 7. The counterforce F forces the portion of the wall 7 against the step surface 19 which extends parallel to the length direction X, thereby forming an undercut 20 between the walls 7, 8 of the chassis parts 2, 3.

Thus, an undercut 20 is provided between the wall 7 of the chassis part 2 and the wall 8 of the chassis part 3 in addition to the form fit and interference fit. As a result, the stability of the joined connection is further enhanced.

Figure 2:
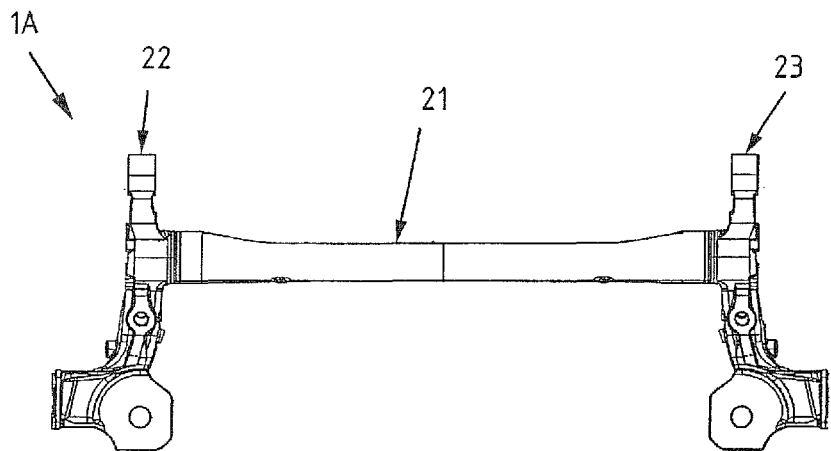
FIG. 2 is a schematic illustration of one embodiment of a chassis assembly according to the present invention.

FIG. 2 shows by way of example a chassis assembly generally designated by reference numeral 1A and constructed in the form of a twist beam axle having chassis parts 21, 22, 23 which are connected together by an internal high pressure joining process. The chassis part 21 is a tubular member having two ends for attachment of the chassis parts 22, 23, respectively, constructed in the form of cast parts for example.

Figure 3:
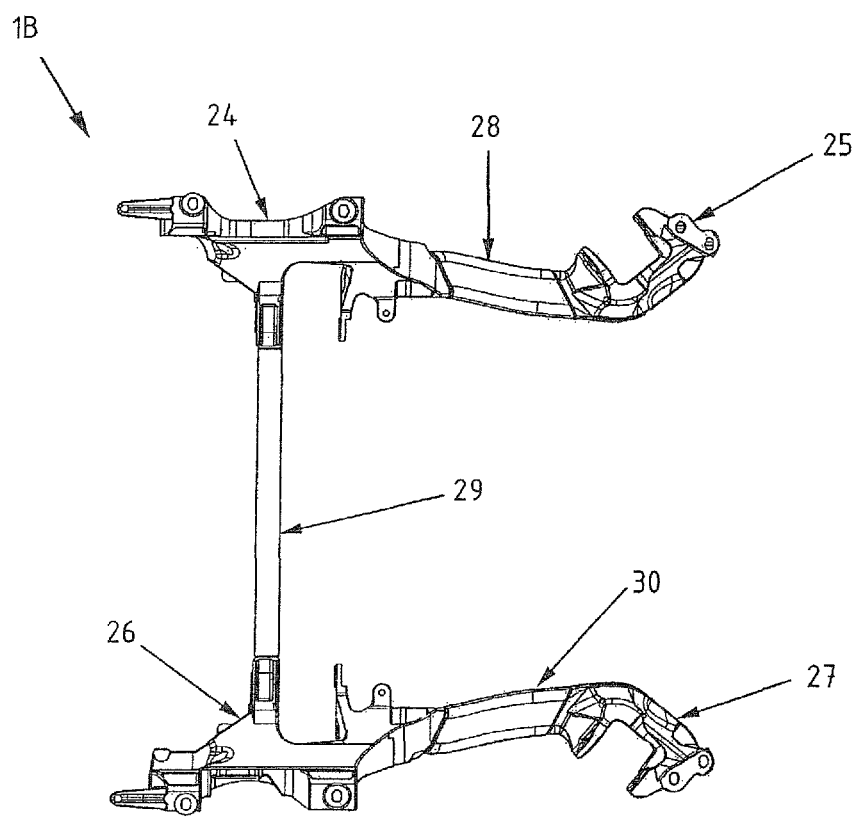
FIG. 3 is a schematic illustration of another embodiment of a chassis assembly according to the present invention.

FIG. 3 shows another example of a cassis assembly, generally designated by reference numeral 1B and constructed in the form of a chassis sub-frame comprised of several cast nodes 24, 25, 26, 27 via which profiles 28, 29, 30 are connected to one another. The profiles 28, 29, 30 are also connected with the cast nodes 24, 25, 26, 27 through internal high pressure joining.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of connecting chassis parts, comprising the step steps of:
   placing one end of a first chassis part in an end of a second chassis part to define an overlap zone;
   introducing a fluid into the first chassis part at an internal high pressure to press a wall part of the first chassis part in the overlap zone outwards into a through opening in a wall of the second chassis part against a counter member configured as a plunger received in the through opening; and
   pushing the plunger into the through opening against a confronting surface of the wall part of the first chassis part to produce an undercut between the wall part of the first chassis part and the wall of the second chassis part and thereby force a portion of the wall part into a recess of a step surface of the first chassis part.

2. The method of claim 1, wherein the introducing step includes clinching the first chassis part with the second chassis part.

3. The method of claim 1, wherein the through opening has a constant diameter.

4. The method of claim 1, wherein the through opening has a diameter which is smaller on an inside surface of the wall of second chassis part than a diameter on an outside surface of the wall of the second chassis part.

* * * * *